United States Patent
Hou

(10) Patent No.: US 7,991,187 B2
(45) Date of Patent: Aug. 2, 2011

(54) INTELLIGENT IMAGE SMOKE/FLAME SENSOR AND DETECTION SYSTEM

(76) Inventor: Billy Hou, Taipei (TW)

( * ) Notice: Subject to any disclaimer, the term of this patent is extended or adjusted under 35 U.S.C. 154(b) by 1007 days.

(21) Appl. No.: 11/892,992

(22) Filed: Aug. 29, 2007

(65) Prior Publication Data
US 2009/0060260 A1   Mar. 5, 2009

(51) Int. Cl.
*G06K 9/00* (2006.01)
*B60Q 1/00* (2006.01)
*G08B 23/00* (2006.01)
*H04M 1/64* (2006.01)
*G10L 21/00* (2006.01)

(52) U.S. Cl. ...... 382/100; 340/425.5; 340/577; 379/88.07; 704/273

(58) Field of Classification Search ...... 382/100; 340/577, 578, 584, 693.12, 425.5, 426.18, 340/438, 463, 506, 628, 693.6, 901; 379/88.07; 704/273
See application file for complete search history.

(56) References Cited

U.S. PATENT DOCUMENTS

| | | | | |
|---|---|---|---|---|
| 5,969,627 A * | 10/1999 | Tarlton et al. | ............ | 340/693.12 |
| 6,615,186 B1 * | 9/2003 | Kolls | ............... | 705/26 |
| 7,505,604 B2 * | 3/2009 | Zakrzewski et al. | .......... | 382/100 |
| 7,710,280 B2 * | 5/2010 | McLellan | .................... | 340/578 |

* cited by examiner

*Primary Examiner* — Abolfazl Tabatabai
(74) *Attorney, Agent, or Firm* — Rosenberg, Klein & Lee

(57) ABSTRACT

An intelligent image smoke/flame/complex intelligent image smoke/flame sensor, and an intelligent image smoke/flame detection system formed of such an intelligent image smoke/flame/complex intelligent image smoke/flame sensor. The intelligent image smoke/flame sensor is formed of an image sensor, for example, CCD (Charge-coupled Device), a DSP Processor, an input/output circuit, an infrared lamp and filter assembly, a casing, a window glass, a front cover, and a rear cover. The intelligent image smoke/flame detection system accurately detects fire characteristics including smoke and flame, producing an early alarm to lower catastrophe.

8 Claims, 7 Drawing Sheets

INTELLIGENT IMAGE SMOKE/FLAME SENSOR AND DETECTION SYSTEM

BACKGROUND OF THE INVENTION

1. Field of the Invention

The present invention relates to fire detection and alarm and more particularly, to an intelligent image smoke/flame detection system, which is comprised of an intelligent image smoke/flame sensor, an information management and digital recording system, a learning and setting adjustment system, and a display and operation panel.

2. Description of the Related Art

Following development of global model identification technology and visualization of the development of fire fighting and security systems in the last century, and more particularly, after 911 events in the USA, the demand for security control is greatly increased, and different video image intelligent detection systems have been continuously created for different purposes. Therefore, different studies and applications are held or performed to monitor different objects.

Fire fighting related organizations and parties are trying hard to study and develop different fire sensors for use in large spaces (exhibition centers, gyms, aircraft shelters, big-scale war Δehouses, big plants, etc.), special buildings (traffic tunnels, petrochemical production zones, explosive storage item storage centers, museums, metros, railway stations, hospitals, etc.) and outdoor public places (woods, parks, communities, etc.).

A large space has the characteristic of wide space of height more than 20 M with a large single building ground area. Early detection of fire in a large space is very difficult. Conventional fire sensors cannot make a quick response to early fire characteristic parameters such as burned gas content, smoke concentration, temperature, etc. For example, an opposite-type smoke sensor can be triggered only when the smoke reaches a predetermined height. Further, conventional non-image type fire sensors cannot point out fire location, therefore the use of conventional non-image type fire sensors cannot help control of fire-extinguishing system to extinguish the fire effectively.

Special buildings have complicated characteristic. Regular fire sensors for special buildings are still not satisfactory in function because they cannot achieve detection rapidly. For certain complicated or poor surrounding conditions such as explosion problems, a quick detection and early report is necessary to ensure fire security control.

Outdoor public places have the characteristics of outdoors, big area, surroundings change with the change of weather, complicated conditions, fire location uncertainty, high randomness, no suitable detection measures, high environmental interference of light, fog, moisture, rain, snow, thunder, etc. For outdoor public place detection, a big area and wide zone monitoring is necessary.

Because of the aforesaid problems, regular fire detection techniques cannot achieve the expected objectives, more particularly, cannot achieve the objectives of early fire detection and early fire control.

China Patent 95100519.7 discloses a fire detection and positioning method by using a three primary color differential technique. This method still has the drawbacks of (a) the three-primary color characteristics of many artificial or natural light sources are similar to that of a flame, and a false alarm rate based on this three-primary color differential method is high; (b) the algorithm is based on flame detection only without smoke detection ability, not suitable for large space or special building early detection and alarm. Chinese Patent 00805204.2 (equivalent to international application WO00/63863 of Oct. 26, 2000) discloses a light cross-section image type smoke detection method. This method is still not satisfactory in function because it is similar to the basic principle of a linear light beam type smoke sensor that is not practical for use in a place having a big height. It is difficult to detect the early rising smoke. Further, the installation of infrared light array is inconvenient. The aforesaid two methods commonly use an industrial computer as a processing platform, i.e., they do not provide a detection front-end adjustment control function.

WO01/57819, U.S. Pat. No. 7,002,478 discloses a fire detection method entitled "Smoke and Flame Detection". This method comprises the steps of: receiving digitized images of the region to be monitored; comparing pixels of one of said images with pixels of another said image according to two predetermined procedures to produce a flame present decision and a smoke present decision; and providing a fire detected signal according to said smoke present and flame present decisions. Another drawback of this method is that the system does not provide an image sensor and matching light source control function. Therefore, it is not practical for use at night. This is the major obstacle in application. Still another drawback of this method is that it requires an industrial server with a keyboard, not easy to pass an international standard fire sensor examination. Therefore, this method cannot obtain an international certification.

SUMMARY OF THE INVENTION

The present invention has been accomplished under the circumstances in view. It is the main object of the present invention to provide an intelligent/complex intelligent image smoke/flame sensor and intelligent image smoke/flame detection system, which has the benefits of:

1. Simple algorithm, easy to constitute a unitary system that satisfies different requirements;

2. Applicable for flame and smoke detection and alarm at the same time, and having high ability in smoke recognition before formation of fire;

3. Having system self-learning function to fit all environments, eliminating false alarm and alarm miss.

According to the present invention, the intelligent image smoke/flame detection system is comprised of an intelligent image smoke/flame sensor, an information management and digital recording system, a learning and setting adjustment system, and a display and operation panel. The intelligent image smoke/flame detection system forms a loop self-learning system to fit the monitored area, eliminating false alarm and alarm miss. The intelligent image smoke/flame sensor is formed of an image sensor, for example, CCD (Charge-coupled Device), a DSP Processor, an input/output circuit, an infrared lamp and filter assembly, a casing, a window glass, a front cover, and a rear cover. The complex intelligent image smoke/flame sensor has additional ultraviolet/infrared fire sensors and different fire sensor signal processing circuits. The sensors have a self-learning function to update the setting of long cycle/short cycle background. The DSP processor provides an operation algorithm with a fire probability fusion data obtained from different fire sensors for obtaining at time fire probability by means of adding to data fusion flow the fire characteristic probability incremental amount obtained through a probability incremental amount and image analysis.

DETAILED DESCRIPTION OF THE PREFERRED EMBODIMENT

Figure 1:
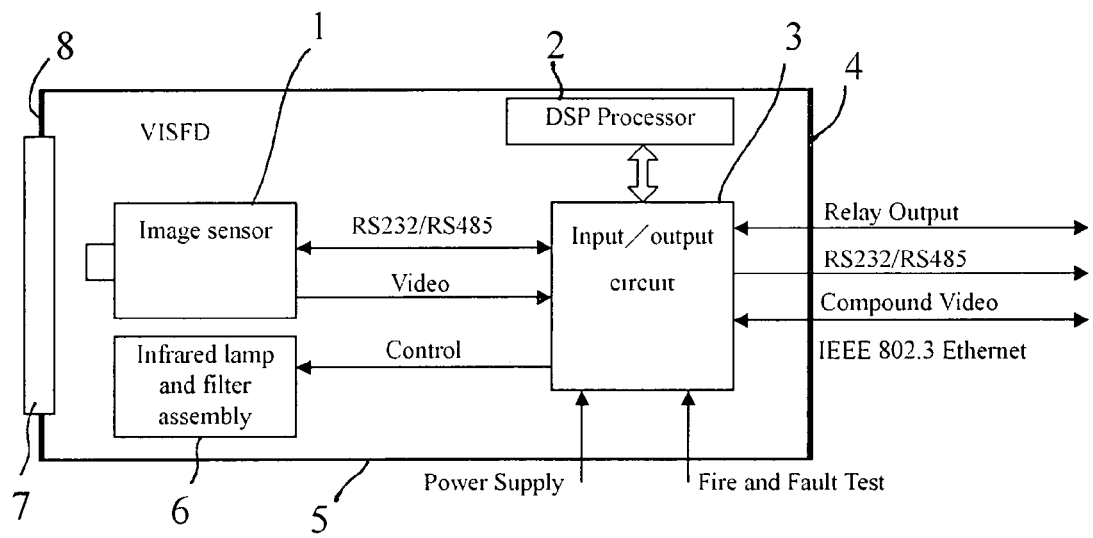
FIG. 1 is a block diagram of an intelligent image smoke/flame sensor in accordance with a first embodiment of the present invention.
Figure 2:
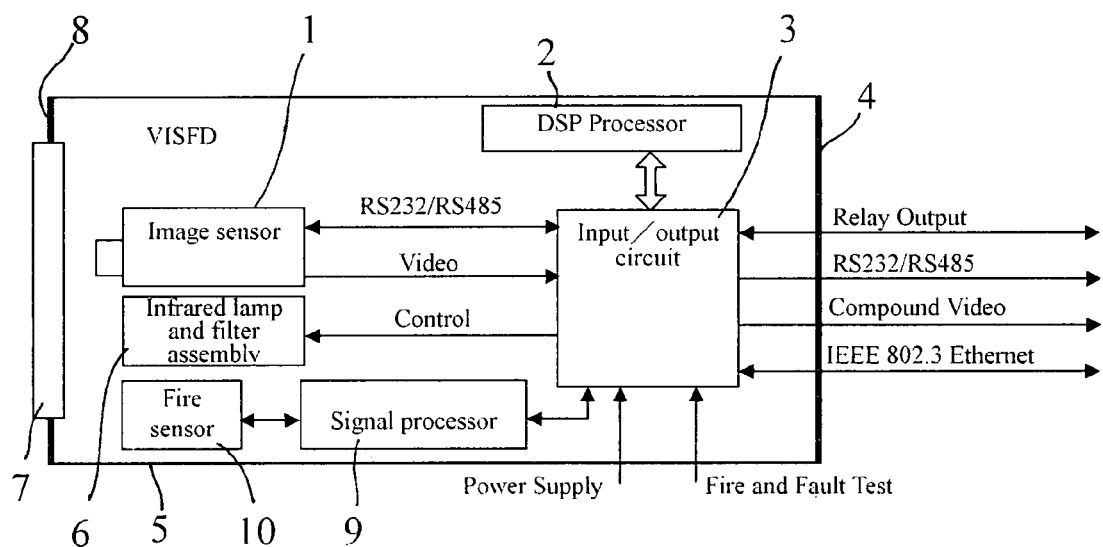
FIG. 2 is a block diagram of an intelligent image smoke/flame sensor in accordance with a second embodiment of the present invention.

Referring to FIG. 1, an intelligent image smoke/flame sensor in accordance with the present invention is shown comprised of an image sensor, for example, CCD (Charge-coupled Device) 1, a DSP Processor 2, an input/output circuit 3, an infrared lamp and filter assembly 6, a casing 5, a window glass 7, a front cover 4, and a rear cover 8.

The CCD 1 is adapted to produce a real-time analog field image signal and to process white balance and aperture adjustment subject to the conditions of the environment, so as to obtain optimal images. The DSP processor 2 is for digitalization, algorithm analysis, decision-making and output control of the analog image signal obtained from the CCD 1. The input/output circuit 3 is adapted to filter and rectify input power supply and to regulate the voltage of processed power supply, and equipped with output relay, input/output interfaces to ensure excellent EMC (Electromagnetic compatibility) characteristics. The infrared lamp and filter assembly 6 is adapted to provide a background light source when the environmental light is weak, and to switch the filter and the CCD to black-and-white status when the infrared light source is started. The window glass 7 is for protecting the CCD 1, ensuring positive falling of visible light/infrared light to the CCD 1 to form an image. The casing 5, the front cover 4, and the rear cover 8 may be made out of metal or any of a variety of other suitable materials. The casing 5, front cover 4 and rear cover 8 form a complete package that protects the internal CCD 1 and the related circuits.

When the environmental light is below a predetermined illumination and the brightness of the field of view calculated by the DSP processor 2 of the intelligent image smoke/flame detection system is below the set value, the DSP processor 2 starts the infrared lamp and switches the CCD (including the filter) into black-and-white operation mode.

The intelligent image smoke/flame sensor further comprises pre-alarm/fire alarm/failure relay outputs, RS232/RS485 serial communication interface, compound video output interface, and TCP/IP Ethernet output interface.

Figure 4:
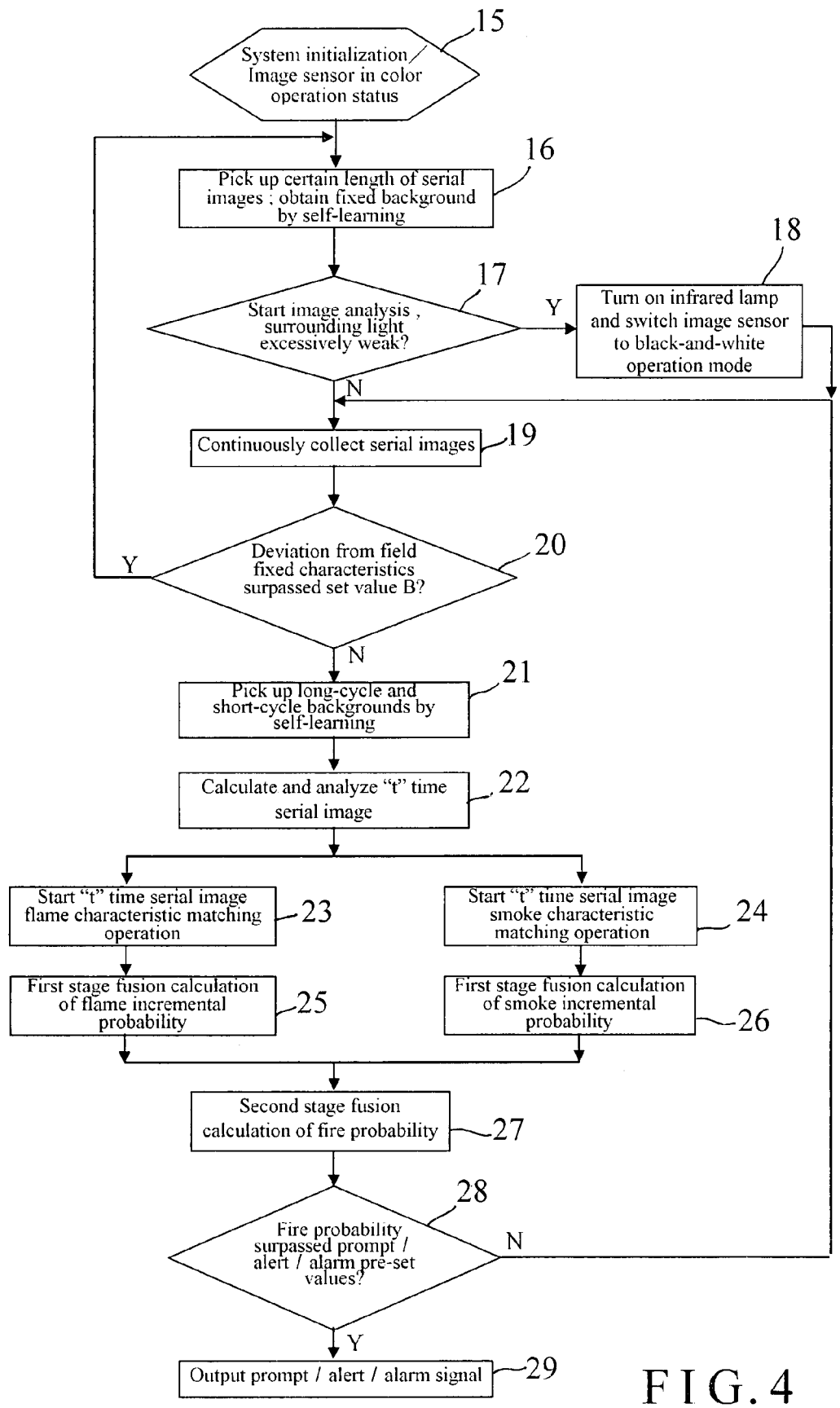
FIG. 4 is a monitoring flow chart of the intelligent image smoke/flame sensor in accordance with the first embodiment of the present invention.

Referring to FIG. 4, the software operation flow of the intelligent image smoke/flame sensor includes the steps of:

15) Start the system to initialize all parameters and I/O interfaces and to set the CCD in color operation status;

16) Pick up a certain length of serial images so as to obtain a fixed background from learning;

17) Obtain the main characteristics of the fixed background and analyze the image to check the strength of the surrounding light rays;

18) calculate the level of the brightness of the field of view, and then enable the DSP processor 2 to turn on the infrared lamp and to switch the CCD to the black-and-white operation mode;

19) The system continuously picks up serial images at a predetermined cycle;

20) Compare parameter series of every image and field fixed characteristics with a predetermined value B, and then proceed to step 28 if the parameter series P surpasses the predetermined value B, or proceed to step 21 if the parameter series P does not surpass the predetermined value B;

21) The algorithm picks up long-cycle and short-cycle backgrounds from learning;

22) Calculate and analyze "t" time serial image;

23) Start a "t" time serial image flame characteristic matching operation, so as to obtain flame-related characteristic information;

24) Start a "t" time serial image smoke characteristic matching operation, so as to obtain smoke-related characteristic information;

25) Make a first stage fusion calculation of flame incremental probability;

26) Make a first stage fusion calculation of smoke incremental probability;

27) Make a second stage fusion calculation of fire probability;

28) Compare the probability values thus obtained with pre-set prompt, alert and alarm values, and then proceed to step 29) if the probability values thus obtained surpassed the respective pre-set values, or return to step (19) if the probability values thus obtained do not surpass the respective pre-set values; and 29) Output prompt/alert/alarm signal.

Figure 5:
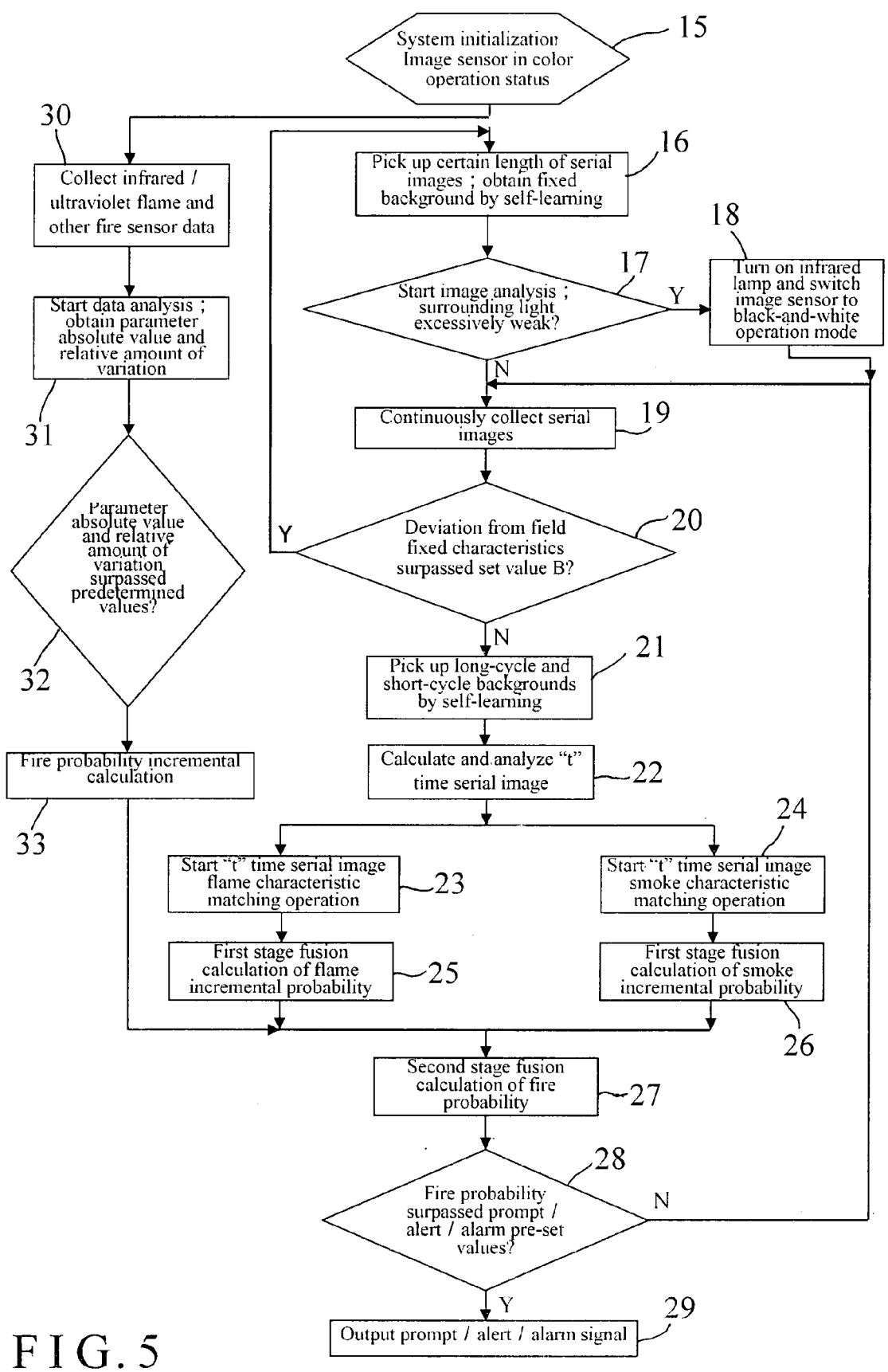
FIG. 5 is a monitoring flow chart of the intelligent image smoke/flame sensor in accordance with the second embodiment of the present invention.

FIG. 5 illustrates an alternate form of the software operation flow of the intelligent image smoke/flame detection system according to the present invention. This alternate form adds a normal fire sensor probability incremental parameter to the data fusion calculation to eliminate errors caused by false fires such as artificial stage cloth or lamp fire, i.e., the alternate form has before step 27) and after steps 25) and 26) the additional steps of:

30) Collect infrared/ultraviolet flame and other fire sensor data;

31) Analyze the data so as to obtain parameter absolute value and the relative amount of variation;

32) Check whether the parameter absolute value and the relative amount of variation surpass the predetermined values or not;

33) Make a fire probability incremental calculation.

30) After step 33), the system proceeds to step 27) to make a second stage fire probability fusion calculation so as to obtain the fire probability P(t) at time "t", and then proceeds to step 28) to compare the probability values with pre-set prompt, alert and alarm values, and then proceed to step 29) if the probability values surpassed the respective pre-set values, or return to step (19) if the probability values do not surpass the respective pre-set values.

Figure 6:
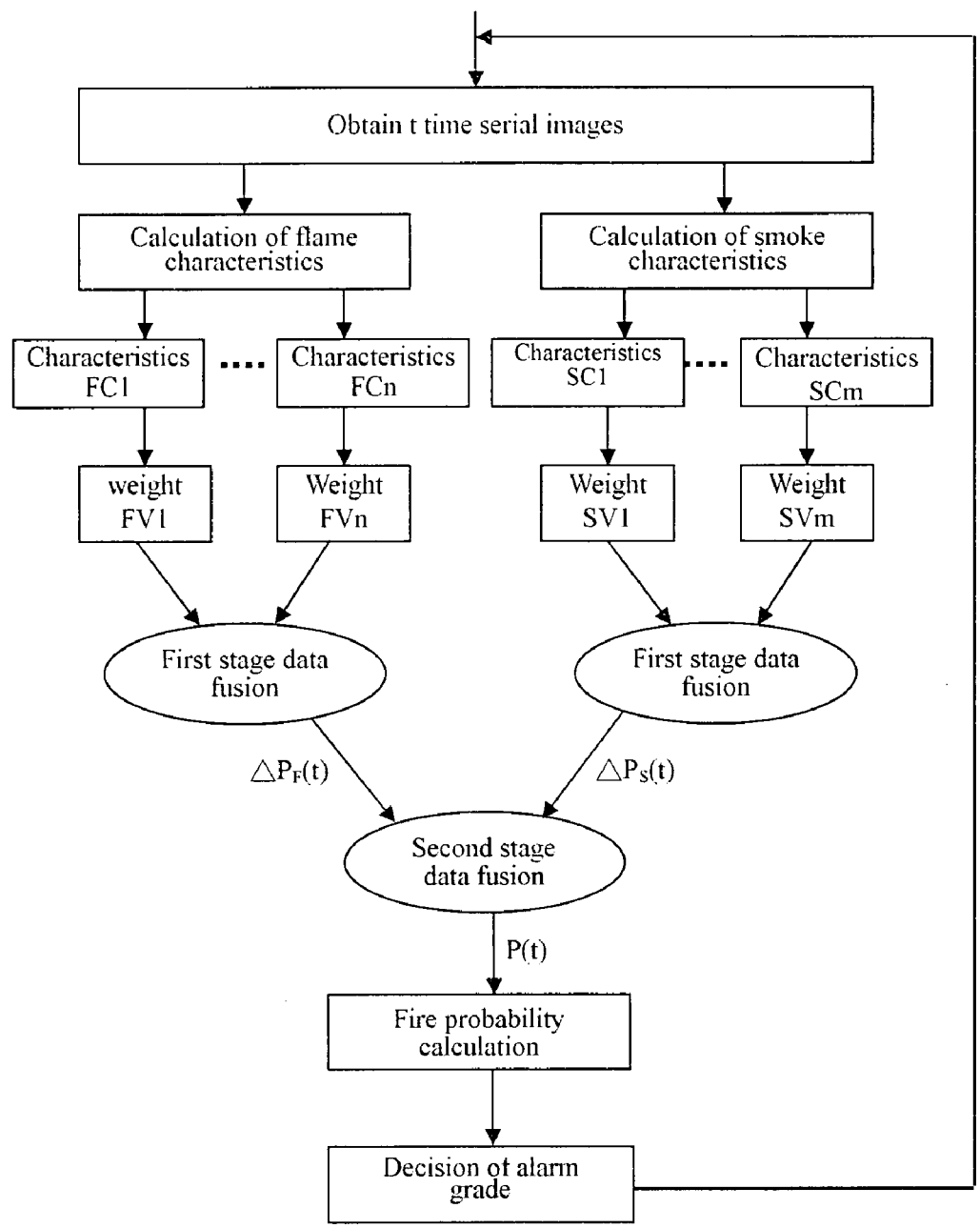
FIG. 6 illustrates the operation algorithm of the intelligent image smoke/flame sensor according to the present invention.

Referring to FIG. 6, the aforesaid algorithm runs as follows: System obtains serial images of length L at time "t", and then picks up flame related motion, color, profile, area rate, ... n kinds of characteristic parameters Fi, i=1, ... n, and smoke related motion, saturation, stripes, ... n kinds of characteristic parameters $S_j$, $j=1, \ldots m$; and the calculates the $i$-th or $j$-th characteristic parameter of the L length serial images; when the parameters of the L length serial images reach a predetermined flame or smoke characteristic ratio, set "t" time's $FC_i=1$, $SC_j=1$, otherwise, set "t" time's $FC_i=0$, $SC_j=0$; with respect to every smoke and flame characteristic, the system gives the importance and secondary importance probability incremental weights $FV_i$, $i=1, \ldots, n$ and $SV_j$, $j=1, \ldots, m$. The importance and secondary importance probability incremental weights can be updated by means of self-learning. Thus, the system makes a first stage data fusion:

$$\Delta P_F(t) = \Sigma FC_i \cdot FV_i$$

$$\Delta P_S(t) = \Sigma SC_j \cdot SV_j$$

Thereafter, the system makes a second stage data fusion:

$$P_F(t) = P_F(t-1) + \Delta P_F(t)$$

$$P_S(t) = P_S(t-1) + \Delta P_S(t)$$

Fire probability calculation I:

$$P(t) = k \cdot P_F(t) + (1-k) \cdot P_S(t)$$

in which k=fixed coefficient
Fire probability calculation II:

$$P(t) = k1 \cdot P_X(t), \text{ if } P(t) > 1, P(t) = 1$$

If smoke appears at first and smoke probability is greater than $P_{thr}$, thus $P_X(t) = P_S(t)$, $k1 = 1 + P_F(t)$
If flame appears at first and flame probability is greater than $P_{thr}$, thus $P_X(t) = P_F(t)$, $k1 = 1 + P_S(t)$
In which, $P_{thr}$, is a dead zone probability threshold value, and any probability smaller than this probability threshold value will be disregarded and its P(t) will not be calculated.

The aforesaid fire probability calculation I is relatively reliable for making a decision. The aforesaid fire probability calculation II is for making a quick decision. These two calculation methods are applicable to video image zone alarm for fire probability fusion calculation of different zones. Subject to the aforesaid calculation, the final fire probability P(t) is obtained. Subject to different probability zones, the system gives different grades of alarm information including warning probability $P_{a1} < P(t) \leq P_{ah}$, pre-alarm probability $P_{p1} < P(t) \leq P_{ph}$, alarm probability $P_{F1} < P(t) \leq P_{Fh}$.

Figure 3:
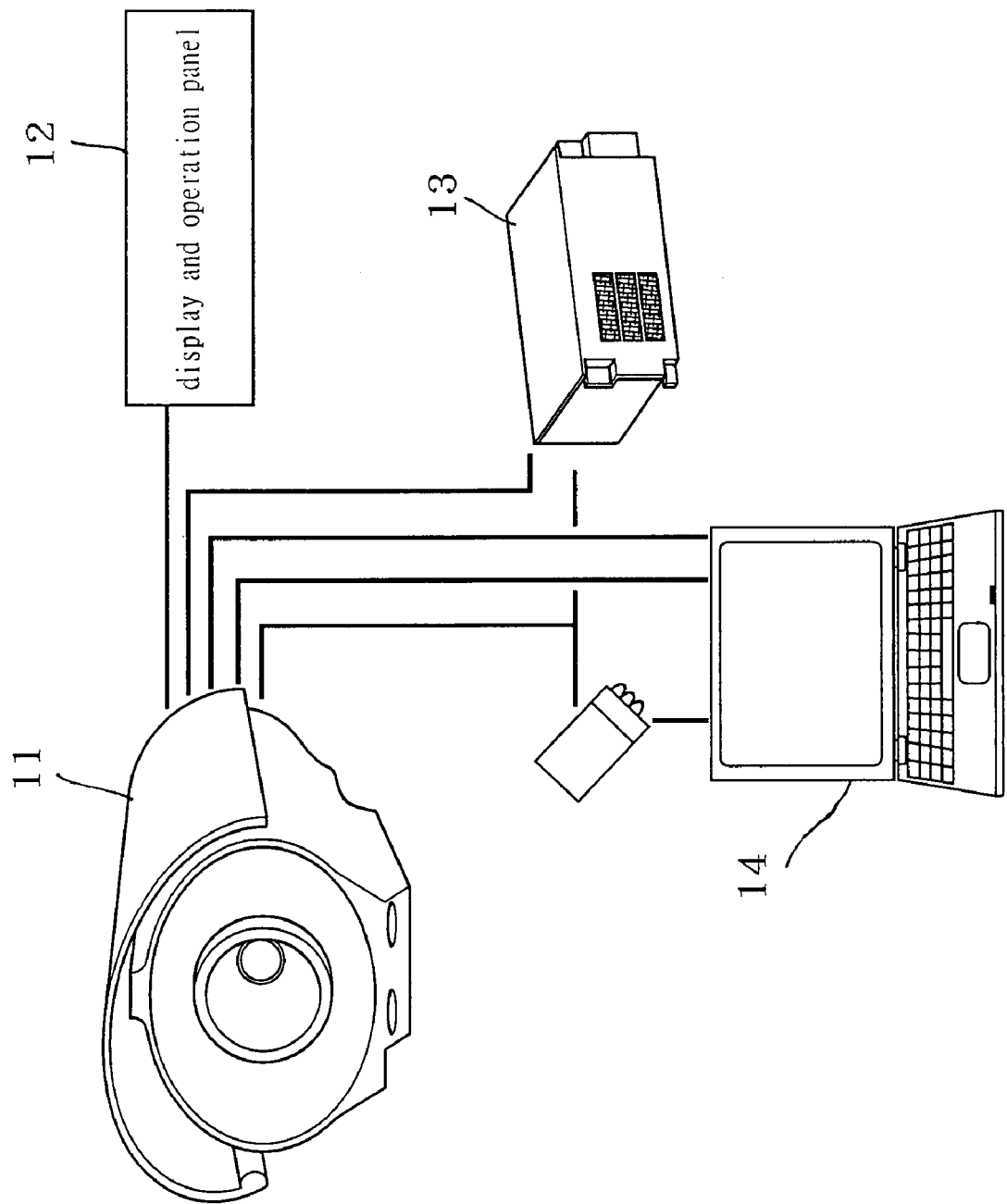
FIG. 3 is a schematic drawing showing the architecture of an intelligent smoke-image flame detecting system according to the present invention.

Referring to FIG. 3, an intelligent image smoke/flame detection system in accordance with the present invention is comprised of an intelligent image smoke/flame sensor 11, an information management and digital recording system 13, a learning and setting adjustment system 14, a display and operation panel 12. The information management and digital recording system 13 is adapted to make an effective management of all alarm and linking control information for display through a GIS map or any other planar map, and to record and release image data at a predetermined time interval, for example, 30 days as one cycle to make an access management. The learning and setting adjustment system 14 is adapted to set the parameters of the intelligent image smoke/flame sensor 11, and to constitute with the other sub-systems a self-learning system so as to fit complicated application environment and to increase the reliability of the system.

Figure 7:
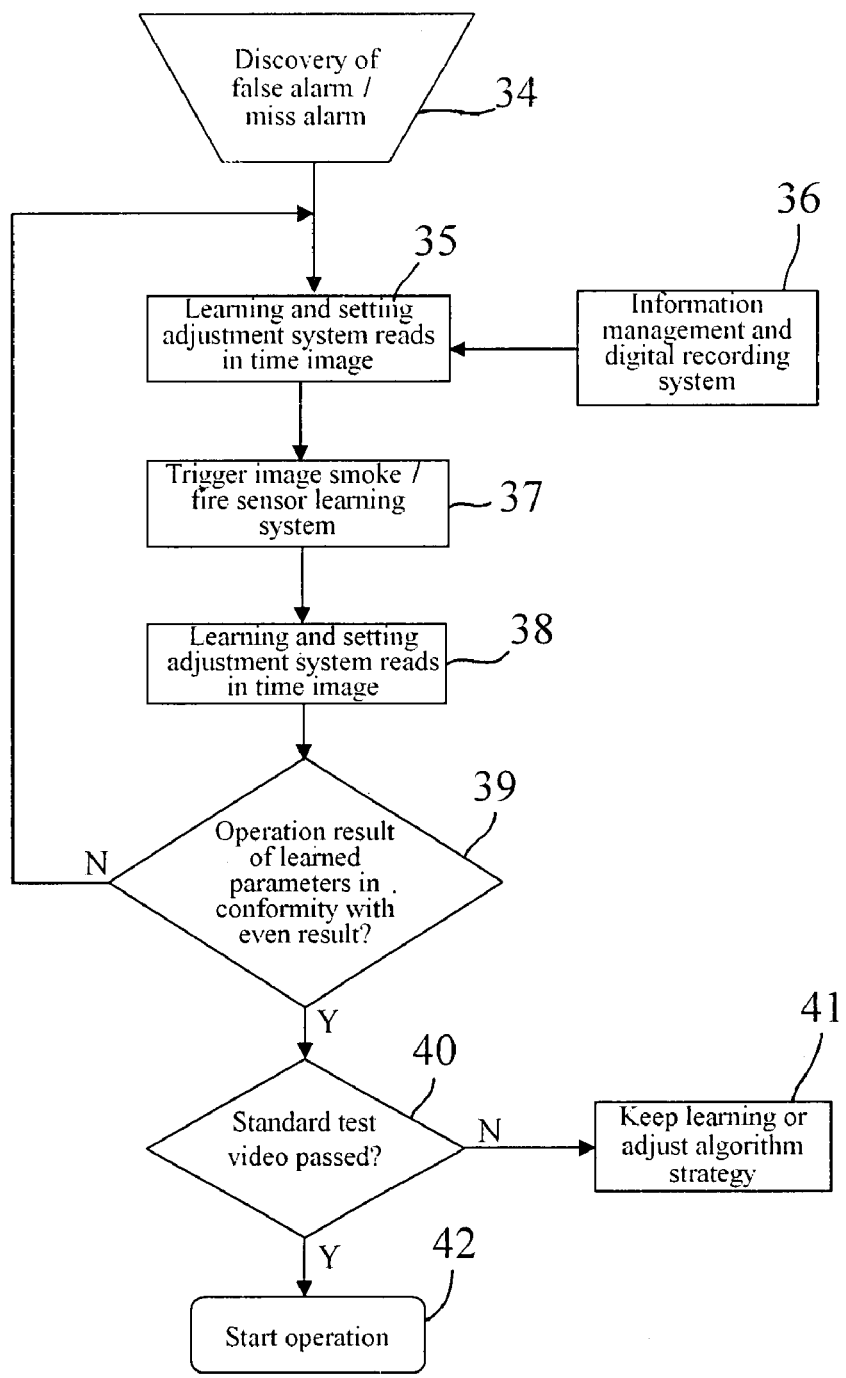
FIG. 7 is an operational flow chart of the loop self-learning system formed of the learning and setting adjustment system, the intelligent image smoke/flame sensor and the information management and digital recording system according to the present invention.

Referring to FIG. 3 and FIG. 7, in case of a false alarm or miss alarm (step 34), the learning and setting adjustment system 14 is connected with the intelligent image smoke/flame sensor 11 and the information management and digital recording system 13 to form a loop self-learning system to produce updated system decision parameters. The learning and setting adjustment system 14 reads in event image data from the information management and digital recording system 13, analyzes the image series that caused the false alarm or miss alarm, and make modified parameters by means of self-learning, and input modified parameters into the intelligent image smoke/flame sensor 11. The intelligent image smoke/flame sensor 11 reads in image data from the learning and setting adjustment system 14 to make sure of modification of system performance subject to a standard fire video verification procedure. When checked OK, the system is ready for application. By means of continuous environmental learning, the system has excellent applicability. Therefore, when a false alarm or miss alarm occurs (step 34), the learning and setting adjustment system reads in time image (step 35), which time image is provided by the information management and digital recording system (step 36). Thereafter, it triggers the image smoke/fire sensor learning system (step 37), and then drives the learning and setting adjustment system 14 to check the learned parameters (step 38), and then checks whether the operation result of the learned parameter parameters fits the even result (step 39), and then proceeds to step 40 when the operation result of the learned parameter parameters fits the even result, or returns to step 35 when the operation result of the learned parameter parameters does not fit the even result. When entered step 40, it checks whether or not to pass the standard test video, and then proceeds to step 41 to keep learning or adjusting calculation strategy when negative, or proceeds to step 42 to start the operation when positive.

Figure 8:
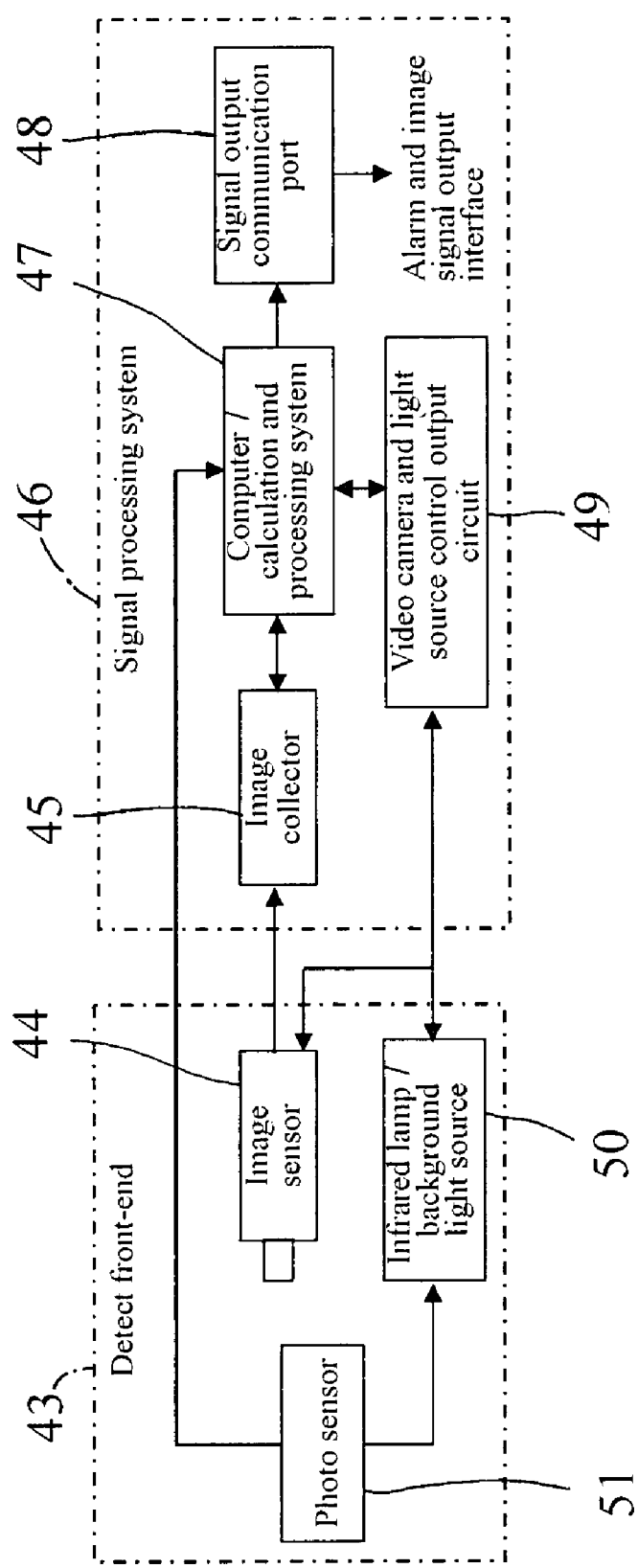
FIG. 8 is a block diagram of a PC/CPU-based intelligent image smoke/flame sensor of the present invention

Referring to FIG. 8, the PC/CPU-based intelligent image smoke/flame sensor of the present invention is comprised of a detection front-end 43 and a signal processing system 46. The detection front-end 43 is comprised of an image sensor, for example, CCD 44, an infrared lamp or background light source 50, and a photo sensor 51. The signal processing system 46 is comprised of an image collector 45, a calculation and processing system, for example computer 47, a video camera and light source control output circuit 49, and an alarm and image signal output interface 48. Except the advantage of the high-performance algorithm, the invention induces the infrared or other type of background light source and the related control function for accurate fire and smoke detection in the dark, eliminating the drawbacks of the conventional designs.

What the invention claimed is:
1. An intelligent image smoke/flame sensor, comprised of an image sensor, a DSP processor, an input/output circuit, an infrared lamp and filter assembly, a casing, a window glass, a front cover, and a rear cover, said DSP processor providing an operation algorithm of statistics of t time serial image characteristics matching and probability fusion calculation, which includes the steps of:
  (i) the system picks up a length L of serial images for at t time;
  (ii) the system makes sure of fixed background characteristics by means of self-learning, in which the cycle for long cycle background to be $T_L$ and the cycle for short cycle background to be $T_S$;
  (iii) the system analyzes the serial images of length m obtained at t time, obtaining the differences and variation between each two images, the differences and variation between each image and the short cycle background image, and the differences and variation between each image and the long cycle background image;
  (iv) the system calculates every characteristic parameter and matches the calculated characteristic parameters with flame/smoke characteristics, so as to set $FC_i$ and $SC_j$ to be 1 if the radio of successful matching images reaches a predetermined value or to be −1 if the radio of successful matching images is below the predetermined value;

(v) the system starts a first stage data fusion subject to different characteristic weights, thereby obtaining flame probability incremental amount and smoke probability incremental amount to be $\Delta P_F(t)$ and $\Delta P_S(t)$ respectively; and (vi) the system starts a second stage data fusion to obtain a fire probability P(t) at t time.

2. The intelligent image smoke/flame sensor as claimed in claim 1, wherein said image sensor is a charge-coupled device.

3. The intelligent image smoke/flame sensor as claimed in claim 1, wherein the surrounding light of the field of view is below a predetermined illumination, said DSP processor turns on the infrared lamp of said infrared lamp and filter assembly and switch said image sensor to a black-and-white operation mode.

4. The intelligent image smoke/flame sensor as claimed in claim 1, which comprises pre-alarm/fire alarm/failure relay outputs, a RS232/RS485 serial communication interface, a compound video output interface, and a TCP/IP Ethernet output interface.

5. An intelligent image smoke/flame sensor, comprised of an image sensor (charge-coupled device), a DSP processor, an input/output circuit, an infrared lamp and filter assembly, a casing, a window glass, a front cover, a rear cover, and a signal processors of ultraviolet/infrared fire sensors, said DSP processor providing an operation algorithm with a fire probability fusion data obtained from different fire sensors for obtaining at time fire probability by means of adding to data fusion flow the fire characteristic probability incremental amount obtained through a probability incremental amount and image analysis.

6. The intelligent image smoke/flame sensor as claimed in claim 1 or 5, which divides different probability zones including warning probability $P_{a1}<P(t)\leq P_{ah}$, pre-alarm probability $P_{p1}<P(t)\leq P_{ph}$, and alarm probability $P_{F1}<P(t)\leq P_{Fh}$ to give different grades of alarm information subject to t time fire probability P(t).

7. An intelligent image smoke/flame detection system comprised of an intelligent image smoke/flame sensor, an information management and digital recording system, a learning and setting adjustment system, and a display and operation panel obtained subject to claim 1 or 5.

8. The intelligent image smoke/flame detection system as claimed in claim 7, wherein said learning and setting adjustment system is connected with said intelligent image smoke/flame sensor and said information management and digital recording system to form a loop self-learning system for producing updated system decision parameters when said intelligent smoke/flame sensor made a false alarm/alarm miss.

* * * * *